United States Patent [19]
D'Onofrio et al.

[11] Patent Number: 5,931,527
[45] Date of Patent: Aug. 3, 1999

[54] SEAT BACK MOUNTED CARGO SHELF

[76] Inventors: Giulio D'Onofrio, 46254 Peach Grove, Macomb Township, Mich. 48044; Theresa M. Delpup-Smith, 6579 Tamarack Dr., Troy, Mich. 48098

[21] Appl. No.: 08/850,843

[22] Filed: May 2, 1997

Related U.S. Application Data

[60] Provisional application No. 60/016,823, May 3, 1996.

[51] Int. Cl.⁶ .................................................. A47B 83/02
[52] U.S. Cl. ...................... 297/146; 297/163; 297/188.05
[58] Field of Search ................................ 297/146, 163, 297/165, 169, 188.04, 188.05; 108/27, 55.1, 55.3

[56] References Cited

U.S. PATENT DOCUMENTS

| | | | |
|---|---|---|---|
| 1,333,301 | 3/1920 | Fohman | 297/164 |
| 1,790,468 | 1/1931 | Frank et al. | 297/146 X |
| 1,809,866 | 6/1931 | Riesche | 108/38 |
| 2,100,261 | 11/1937 | Montgomery | 297/188.06 X |
| 2,173,569 | 9/1939 | Troendle | 297/146 |
| 2,239,732 | 4/1941 | Mewjardt . | |
| 2,249,287 | 7/1941 | Gearhart | 297/146 |
| 2,619,395 | 11/1952 | Kent | 311/21 |
| 3,696,762 | 10/1972 | Holdham | 108/134 |
| 3,946,678 | 3/1976 | Birge, II et al. | 108/44 |
| 4,105,816 | 8/1978 | Hori | 528/159 |
| 4,258,504 | 3/1981 | Hicks | 49/56 |
| 4,341,418 | 7/1982 | Chappell | 297/192 |
| 4,443,034 | 4/1984 | Beggs | 296/65 |
| 4,466,659 | 8/1984 | Carpentier et al. | 297/191 |
| 4,489,600 | 12/1984 | Tamamushi | 108/44 |
| 4,552,271 | 11/1985 | Kranz | 108/27 X |
| 4,792,183 | 12/1988 | Townsend, III | 297/146 X |
| 5,121,958 | 6/1992 | Goeden et al. | 296/37.1 |
| 5,140,914 | 8/1992 | Bohbot et al. | 108/44 |
| 5,415,457 | 5/1995 | Kifer | 297/188.04 |
| 5,427,033 | 6/1995 | Bly | 108/44 |
| 5,492,257 | 2/1996 | Demick | 224/275 |

*Primary Examiner*—Peter R. Brown
*Attorney, Agent, or Firm*—Gifford, Krass, Groh, Sprinkle, Anderson & Citkowski, P.C.

[57] ABSTRACT

A shelf assembly is configured to be supported on a vehicular seat back. The assembly includes a shelf which is pivotably adjustable relative to the seat back. The shelf may be adjusted to retain items on its top surface, and it may also be angularly adjusted downward to retain items therebeneath. The assembly includes a cargo net for retaining loose items. When not in use it is folded into the seat for storage.

13 Claims, 11 Drawing Sheets

SEAT BACK MOUNTED CARGO SHELF

RELATED APPLICATION

This patent application claims priority of provisional patent application Ser. No. 60/016,823 filed May 3, 1996 and entitled "Seat Back Mounted Cargo Shelf".

FIELD OF THE INVENTION

This invention relates generally to vehicular storage units. More specifically the invention relates to a storage shelf which is mounted on the back of a vehicular seat and which may be readily adjusted to different positions.

BACKGROUND OF THE INVENTION

Vans, utility vehicles, station wagons and the like are of ever increasing popularity because they can accommodate both passengers and relatively large amounts of cargo. In a typical van or utility vehicle, a large cargo area is provided behind the rearmost seat. While the cargo area can accommodate a number of large items, consumers frequently encounter problems in its use, particularly when a number of small or oddly shaped items are being transported because the large cargo area permits these items to move about as the vehicle accelerates, decelerates and turns. Loose cargo can become easily damaged and can present a significant safety hazard, particularly in the case of an accident. A number of approaches have been implemented to the containment and control of cargo, and these include the affixing of shelves, racks or bins within a cargo area of the vehicle. While such items can function to contain cargo and restrict its movement, bins, shelves and racks must be appropriately configured for specific cargo. Additionally, such items decrease the usable cargo space in a vehicle.

There is a need for a cargo storage system for motor vehicles, particularly vans and utility vehicles, which can contain a variety of differently shaped cargo. Furthermore, it is highly desirable that any such cargo storage system be capable of being folded out of the way when not in use. As will be described in greater detail hereinbelow, the present invention provides a seat mounted cargo management system which is simple to manufacture, easy to use and capable of accommodating a variety of items. In addition, the system of the present invention is supported by, and stowable in, the seat back of a vehicle so that it may be readily folded out of the way when not in use. These and other advantages of the present invention will be readily apparent from the drawings, discussion and description which follow.

It is known to mount tables and the like on the back of vehicular seats. For example, it is conventional in airliners to include seat back tables. However, such seat back tables are relatively small and not adaptable to the stowage of large amounts of cargo. Furthermore, such seat back tables are not configured so that the table surface may be angularly positioned, as would be necessary for cargo stowage. A package retaining rack for a motor vehicle is shown in U.S. Pat. No. 3,309,135. This rack is configured as part of a vehicle seat; however, the rack is not mounted on the seat back, but projects from the front of the seat and precludes use of the seat when the rack is being employed. U.S. Pat. No. 5,529,265 discloses a mounting system for supporting a video display on the back of a vehicular seat; however, this patent does not disclose any type of cargo supporting tray, much less a repositionable tray of the type disclosed herein.

BRIEF DESCRIPTION OF THE INVENTION

There is disclosed herein a shelf assembly which is configured to be supported on a vehicular seat back. The assembly includes a guide member and a pivot member which is positionable along the length of the guide member. A shelf tray is pivotably supported by the pivot member. The assembly further includes a support brace which has a first end pivotably affixed to the shelf tray, and a second end which is in mechanical engagement with the seat back. The system also includes positioning means for selectably immobilizing the pivot member relative to the guide member so that the angular relationship between the shelf tray and the guide member may be selectably defined when the pivot block is so immobilized.

In one embodiment of the invention, the support member is a track, and the pivot member is a block which slides in the track. In certain versions of this embodiment, the positioning means may include a pin which operates to immobilize the pivot block in the support track. In some embodiments, the guide member is supported by a flange which is employed to mount the assembly onto the frame of a seat. The flange may also retain the second end of the support brace, and in some embodiments, the second end of the support brace is repositionable along the flange.

In other embodiments of the invention, the support member comprises a toothed rack, and the pivot member includes a gear which engages the teeth of the rack. In this embodiment, the positioning means may be operable to immobilize the gear upon the track.

In some embodiments of the invention, the shelf assembly may also include a cargo net for retaining loose items on the shelf tray. In yet other embodiments, the tray itself may be configured to assist in retaining articles thereupon. For example, the tray may include a pop-up lip or a slide-out extension; also, the tray may include a body of non-skid material on the upper face thereof.

DETAILED DESCRIPTION OF THE INVENTION

Figure 1:
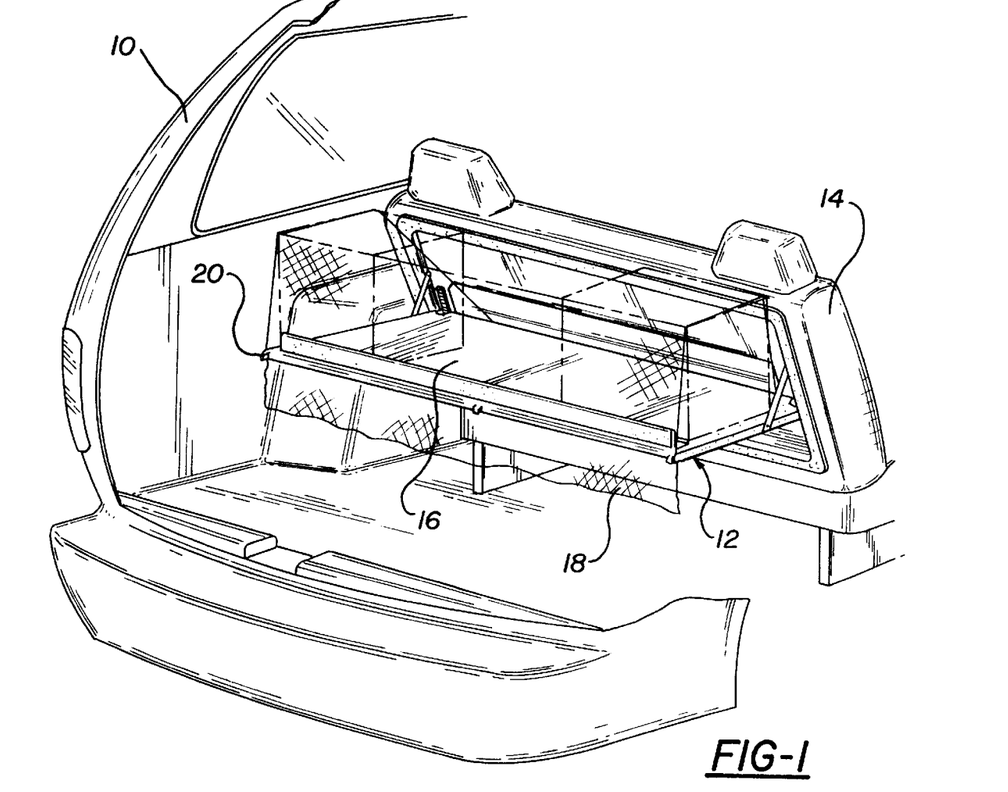
FIG. 1 is a partially cut away view of the rear portion of a minivan depicting one embodiment of the cargo storage unit of the present invention.
Figure 2:
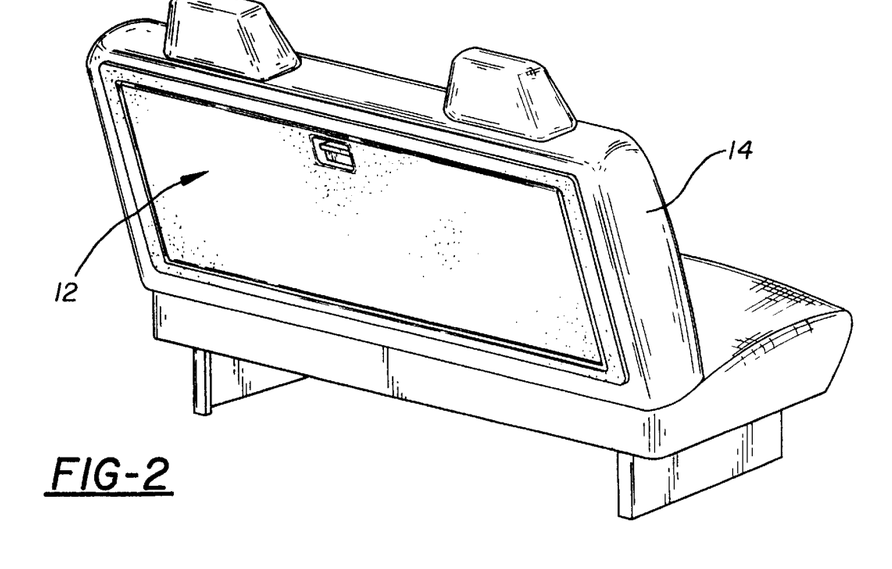
FIG. 2 is a perspective view of the rear seat of the minivan shown in FIG. 1, having the cargo storage unit of FIG. 1 in a storage position.

It is to be understood that the system of the present invention may be implemented in a variety of configurations, and for purposes of description some particular configurations are shown herein; however, these configurations are illustrative, and not limiting upon the practice of the present invention, and other embodiments thereof will be readily apparent to one of skill in the art. Referring now to FIG. 1, there is shown a cut away view of a portion of a minivan 10 having an embodiment of cargo storage system 12 disposed therein. As illustrated, the storage system 12 is supported and retained by the back of a conventional vehicular seat 14. As illustrated in FIG. 1, and as will be explained in greater detail hereinbelow, the system 12 includes a shelf 16 depending from the back of the seat 14. The shelf is configured to support a number of items thereupon, and preferably includes a cargo net 18 for restricting travel of items retained upon the shelf. As will be explained in greater detail hereinbelow, the cargo net 18 may be positionable and attachable to the shelf. As further illustrated, the shelf includes a lip portion 20 which further aids in retaining packages thereupon. As illustrated in FIG. 2, the shelf assembly 12 folds into the back portion of a seat 14 for storage so as to permit unimpeded access to the cargo area of the vehicle.

Figure 3:
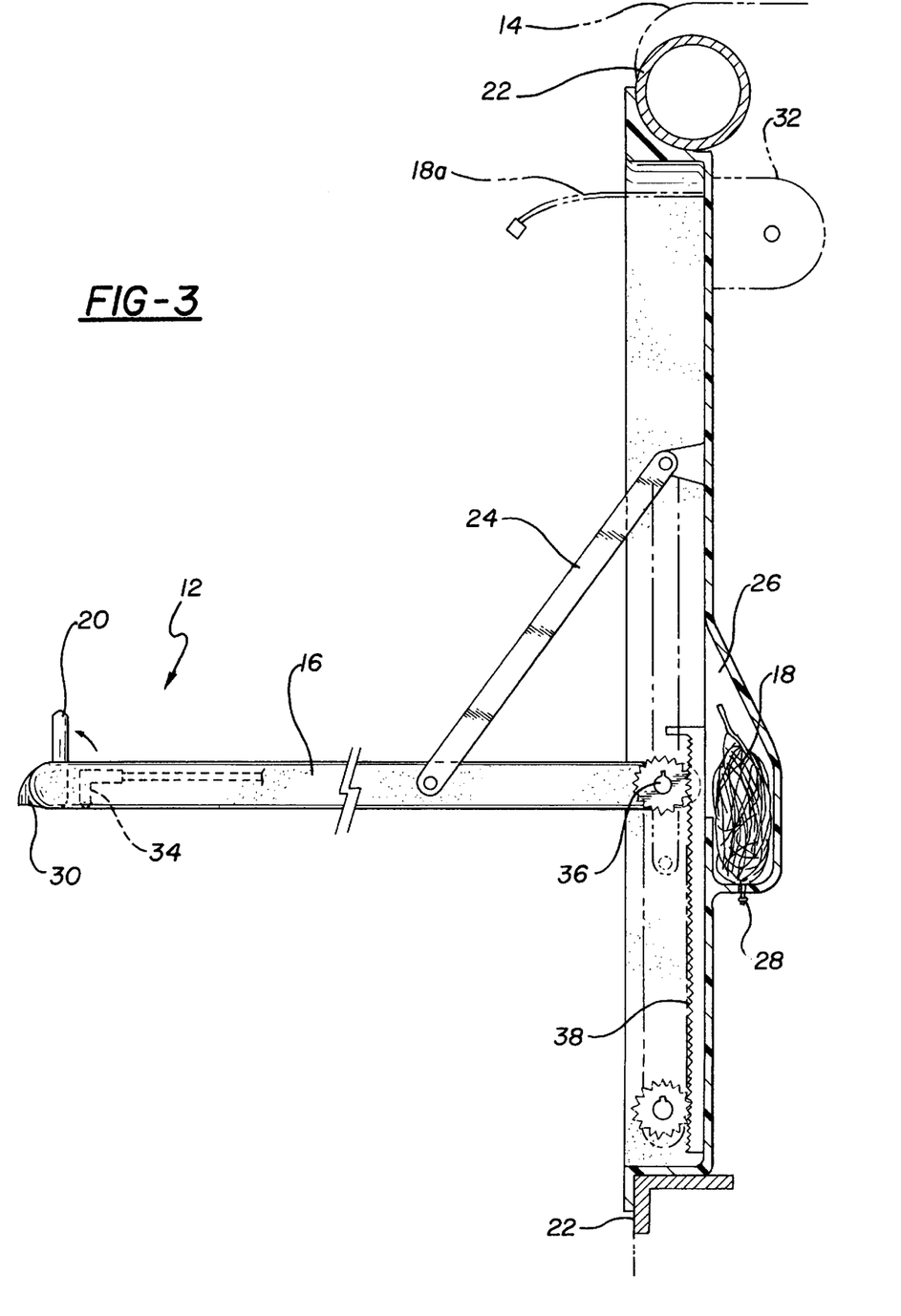
FIG. 3 is a side elevational view, partially cut away, of the cargo storage unit of FIG.1.

Referring now to FIG. 3, there is shown a side elevational view, partially cut away, of the shelf unit 12 of FIG. 1. As illustrated, the unit 12 is self contained and readily fits into the back of a vehicle seat 14. The unit is retained against the frame 22 of the seat 14. In the illustrated embodiment, the shelf unit 12 includes a shelf portion 16 which provides a generally planar surface for supporting a number of items thereupon. As illustrated, the shelf portion 16 is pivotally supported by a brace member 24. As shown in FIG. 3, a cargo net 18 is stored in a pocket 26 defined in the housing of the shelf unit 12. The net 18 is secured to the housing by a retainer bead or knot 28, and may be pulled from the storage pocket 26 and draped over loose items stored on the shelf 16. The shelf 16 includes a series of hooks, one of which is illustrated at reference numeral 30. The hooks engage and retain the net 18.

In an alternative embodiment, another net 18a may be provided. This net 18a is stored upon an inertial locking roller 32, of the type commonly employed in combination with seat belts. The roller 32, as is known in the art, will lock upon experiencing a sudden deceleration thereby locking the cargo net. In this specific embodiment, the net 18a is draped over the cargo and attached, for example, at hook 30, and only locks if and when needed.

As further illustrated in FIG. 3, a flip up stop member 20 is provided on the shelf 16. This member 20 may be lifted up to provide a lip for retaining loose items on the shelf, and may be folded away when not in use. The embodiment illustrated in FIG. 3 includes a positioning assembly for adjusting the angular relation between the shelf 16 and seat back. This assembly includes a lock release, shown herein in phantom outline at reference numeral 34, which coacts with a position lock assembly, a portion of which is visible herein and comprises travel gear 36 and associated rack 38.

Figure 4:
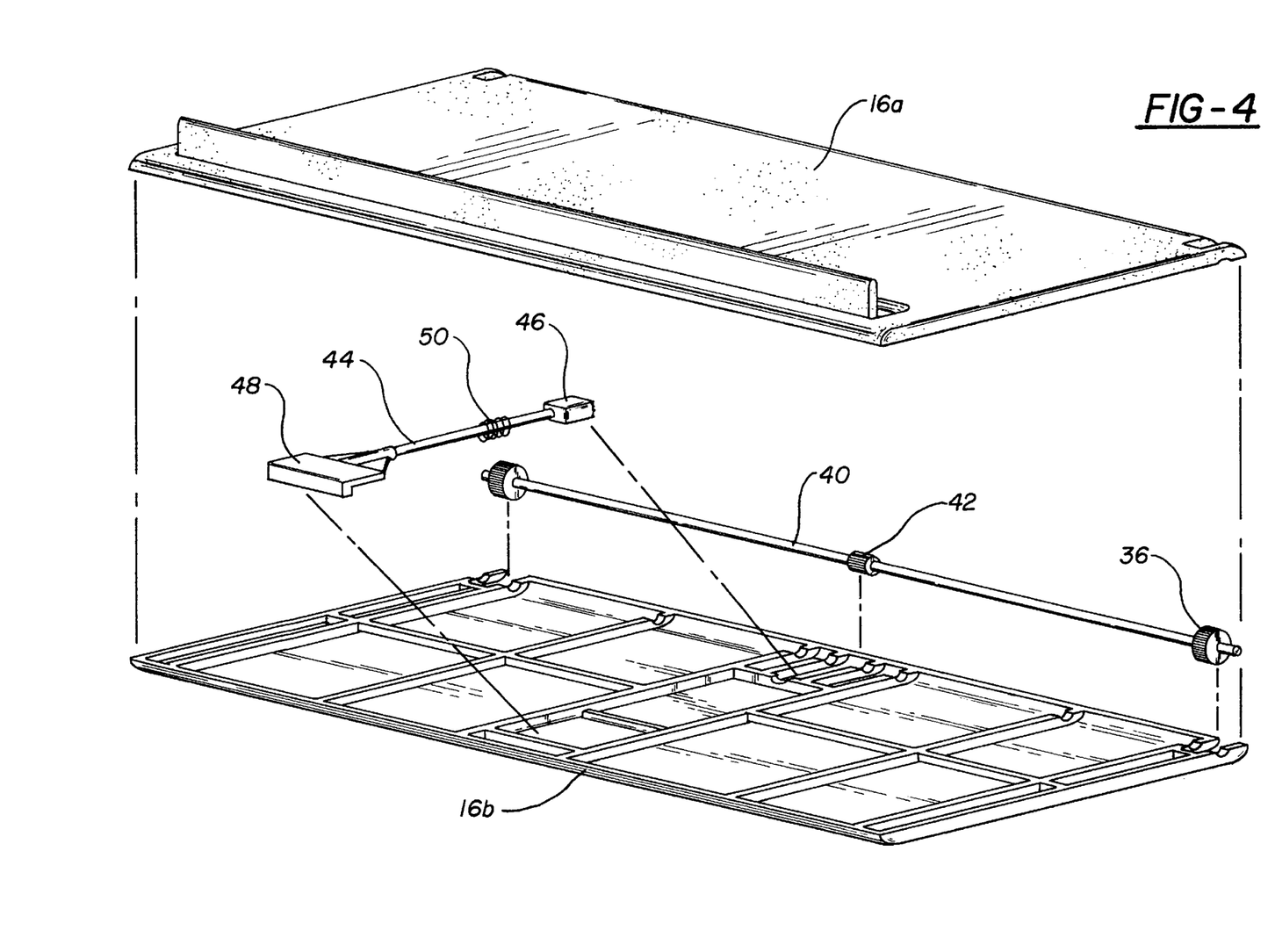
FIG. 4 is an exploded, perspective view of the shelf portion of the cargo storage unit shown in FIG. 1.

Referring now to FIG. 4, there is shown the shelf portion of the assembly of FIGS. 1–3, in an exploded view. Specifically illustrated in FIG. 4 is the support shelf 16, which is comprised of top portion 16a and bottom portion 16b together with the positioning mechanism referred to above. The top portion 16a and bottom portion 16b of the shelf are preferably fabricated from an engineering thermoplastic material and enclose the positioning hardware thereof. As illustrated, the positioning system includes a shaft 40 having two travel gears 36 at either end thereof, and a positioning gear 42 therebetween. The shaft 40 is supported by a series of journals defined in the shelf housing 16a, 16b, so as to be rotatable therein. A locking assembly comprising a second shaft 44 is also supported within the shelf and includes a gear lock 46 at one end thereof, a lock release 48 at the other end thereof, and a spring 50 therebetween. The gear lock 46 includes a toothed portion which engages the position gear 42 so as to prevent it from rotating. As will be seen from the figure, the lock release 48 may be withdrawn so as to disengage the gear lock 46 from the position gear 42, against the biasing force exerted by the spring 50. In this manner, the shelf 16 may be pivoted about the first shaft 40 freely so as to allow for adjustment of its position relative to the seat back.

Figure 5:
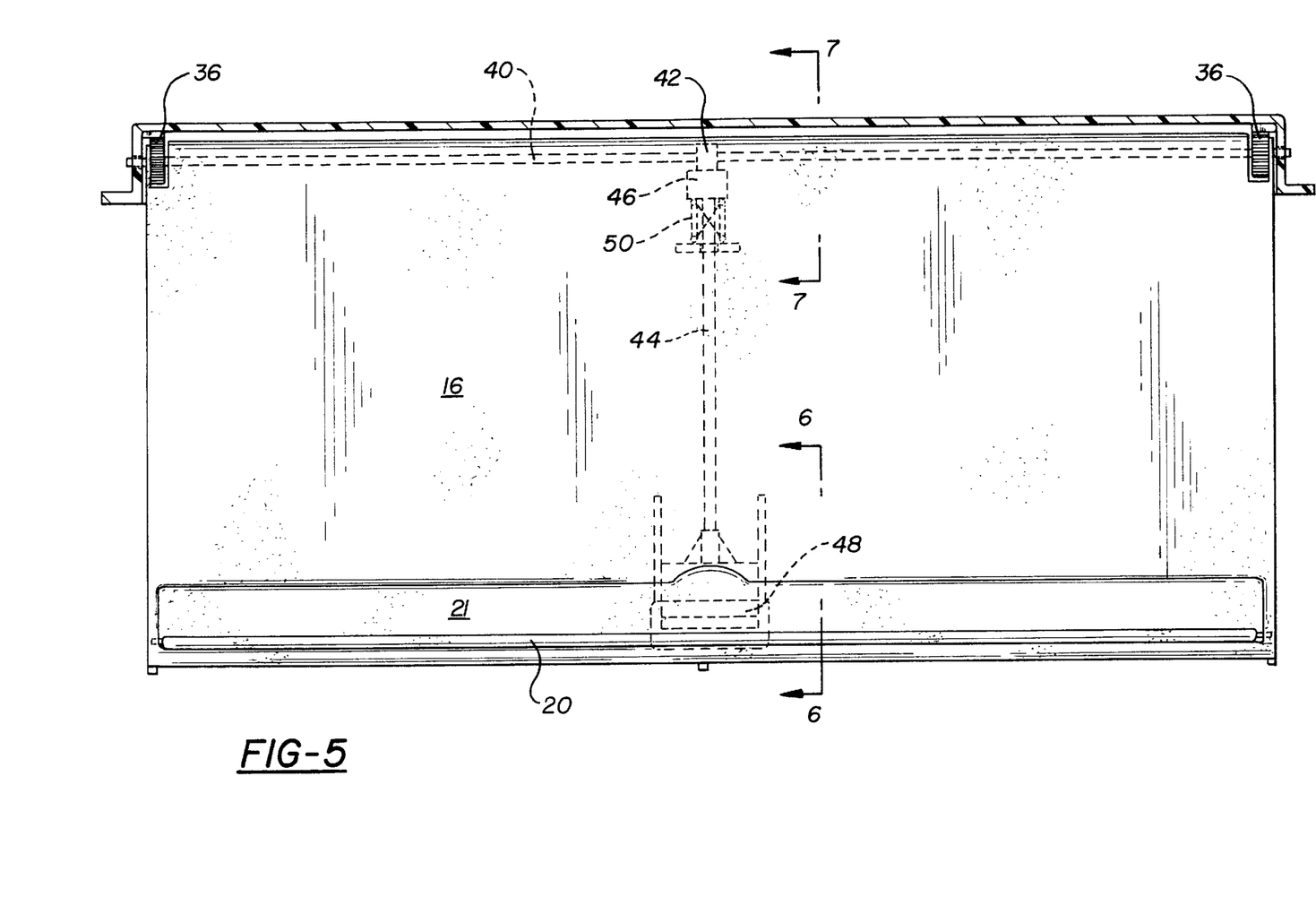
FIG. 5 is a top plan view, partially cut away, of the cargo storage unit of FIG. 1.

FIG. 5 depicts the assembly of FIG. 3 in a top plan view and specifically shows the shelf 16 and travel gears 36. Also illustrated in FIG. 5 is the stop ledge 20, and a recess 21 defined in the shelf 16 for receipt of the stop ledge 20.

FIG. 5 depicts the locking mechanism, shown in FIG. 4, in phantom outline. Specifically shown is the first shaft 40 and the position gear 42 supported thereupon. FIG. 5 also illustrates the second shaft 44 together with the associated gear lock 46, lock release handle 48 and spring 50.

Figure 6:
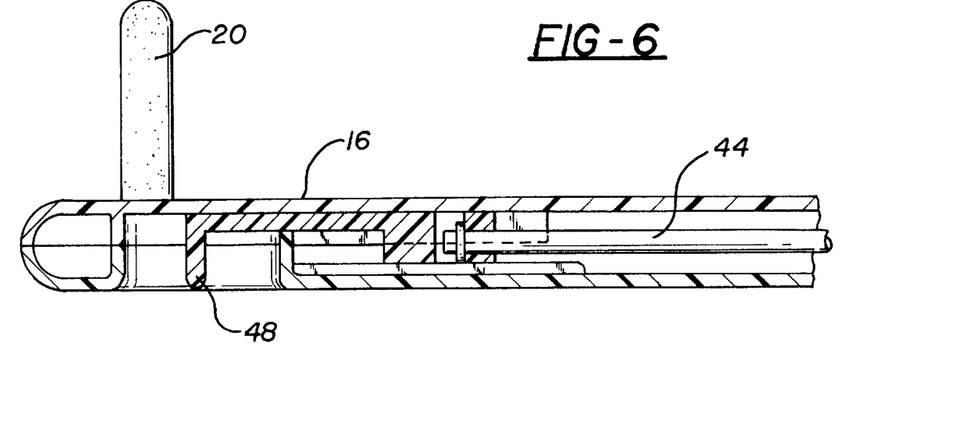
FIG. 6 is across-sectional view of the cargo storage unit shown in FIG. 5, taken along line 6—6.

Referring now to FIG. 6, there is shown a cross-sectional view of the shelf of FIG. 5 taken along line 6—6. FIG. 6 specifically shows details of the shelf 16 together with the second shaft 44, and the lock release handle 48.

Figure 7:
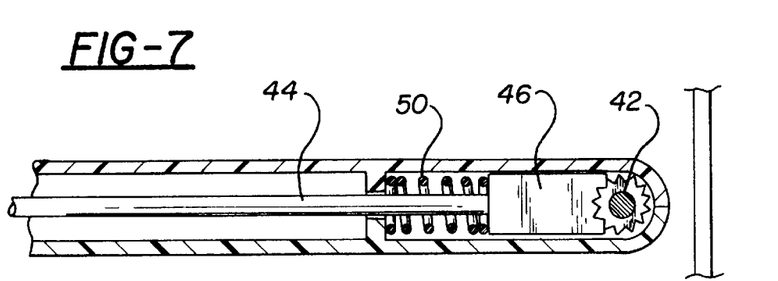
FIG. 7 is a cross-sectional view of the cargo storage unit of FIG. 5 taken along line 7—7.

FIG. 7 is a cross-sectional view of the same shelf of FIG. 5 taken along lines 7—7 and illustrates the second shaft 44, the gear lock 46 as engaged with the position gear 42 under the biasing influence of the spring 50.

Figure 8:
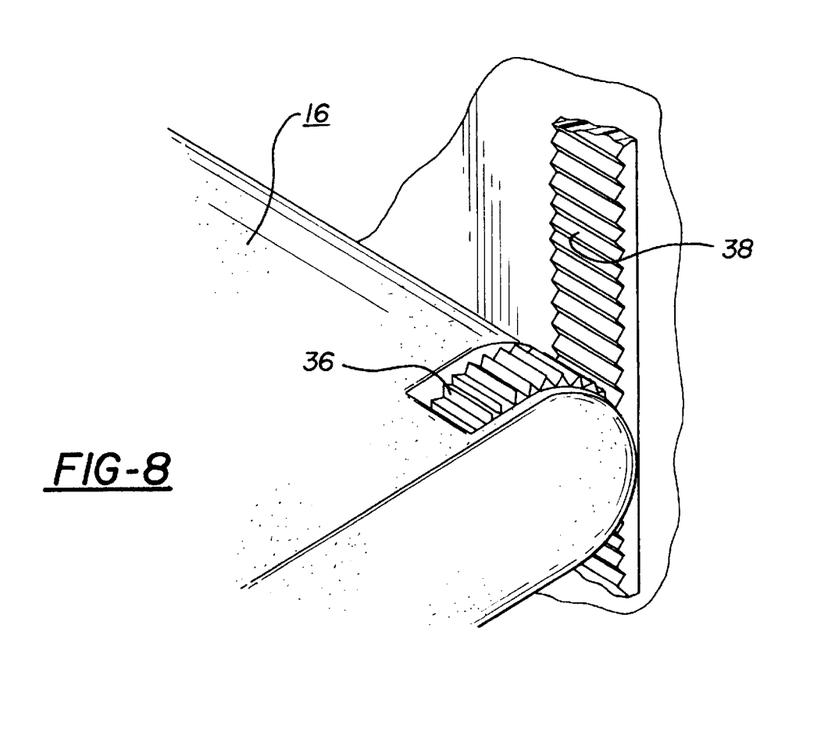
FIG. 8 is an enlarged, perspective view of a portion of the positioning system for the cargo storage unit of the present invention.

FIG. 8 is an enlarged, perspective view of the travel gear 36 as engaged with its corresponding rack 38. It will be understood from FIGS. 4–8 that the shelf may be positionally adjusted by operating the lock release handle 48 so as to disengage the gear lock 46 from the position gear 42. When this is done, the shelf 16 may be pivoted about the first shaft 40. Releasing the handle 48 will reengage the gear lock 46 and position gear 42 by also locking the travel gears 36 with their associated racks 38.

Figure 9:
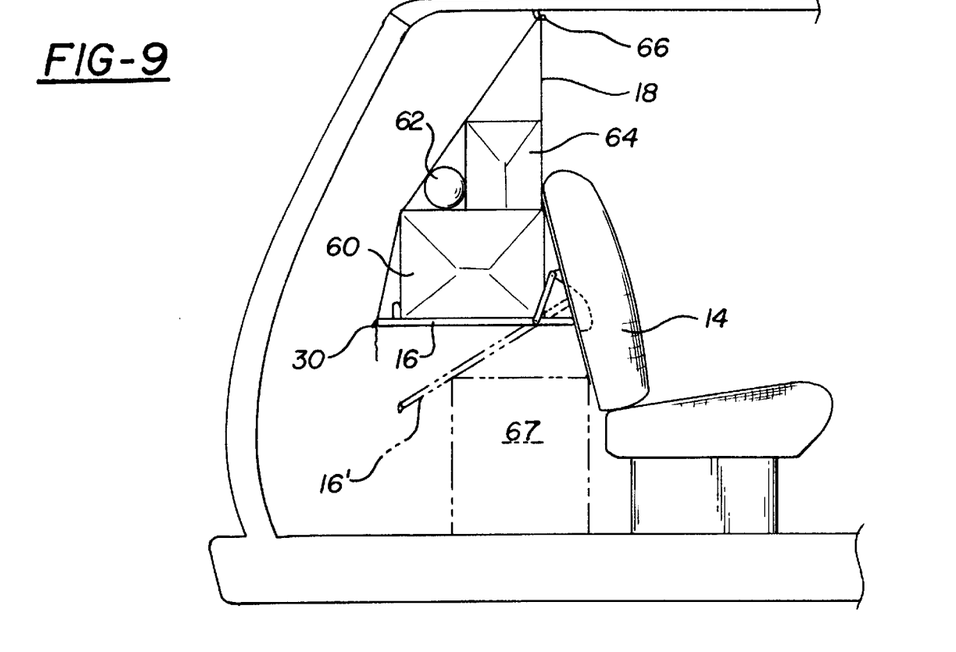
FIG. 9 is a cut away, side elevational view of the cargo storage unit of the present invention as shown in a first use position.

Referring now to FIG. 9 there is shown a depiction of the shelf assembly of the present invention in a first position, wherein the shelf portion 16 is approximately horizontal, and has a number of packages 60, 62, 64 retained thereupon. In the illustrated embodiment, a cargo net 18 is strung from the shelf 16 to a hook 66 mounted on the ceiling of a vehicle, and from thence onto another hook 30 disposed on the shelf. In this manner, the net 18 separates the cargo area from the passenger area of the vehicle. It is to be understood that the net may otherwise be deployed. For example, the net may not be attached to the ceiling of the vehicle, or in some instances the net may be dispensed with.

FIG. 9 also illustrates, in phantom outline, a second positioning of the shelf 16. As specifically shown, the shelf, as indicated at 16', can be pivoted downward by operation of the position mechanism described hereinabove, so as to retain a large package 67 upon the floor of the vehicle between the shelf 16' and back of the seat 14.

Figure 10:
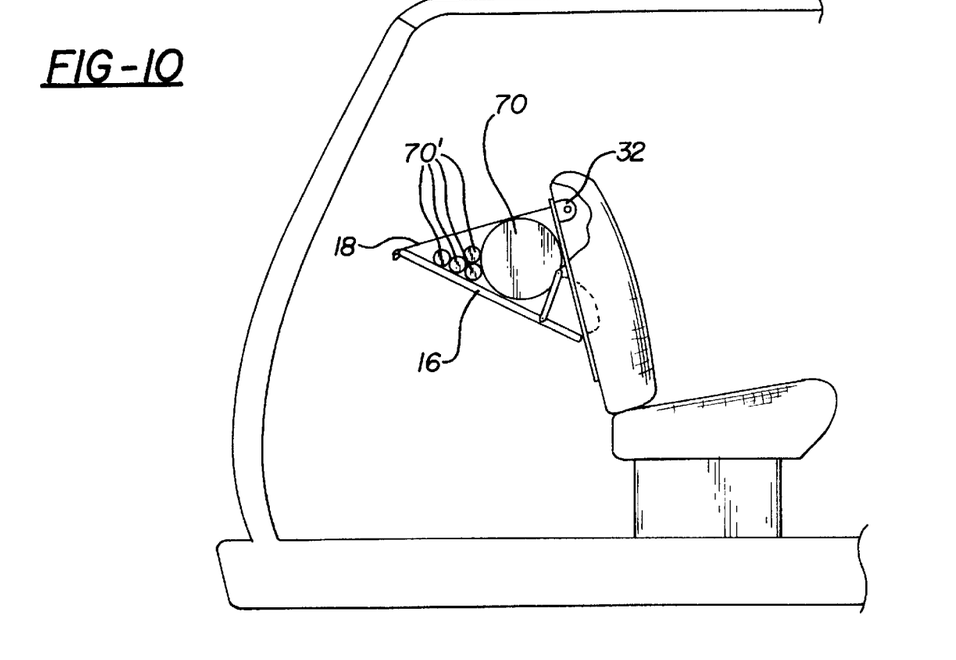
FIG. 10 is a cut away, side elevational view of the vehicle of FIG. 9 showing the storage unit of the present invention in an alternative use position.

Referring now to FIG. 10, there is shown yet another employment of the shelf 16 of the present invention. In FIG. 10, the shelf 16 is disposed so as to form a nonhorizontal support surface for retaining cylindrical items 70, 70' thereupon. In the embodiment of FIG. 10, the cargo net 18 is deployed from the top of the shelf assembly and includes the inertial locking reel 32 described with reference to FIG. 3.

Figure 11:
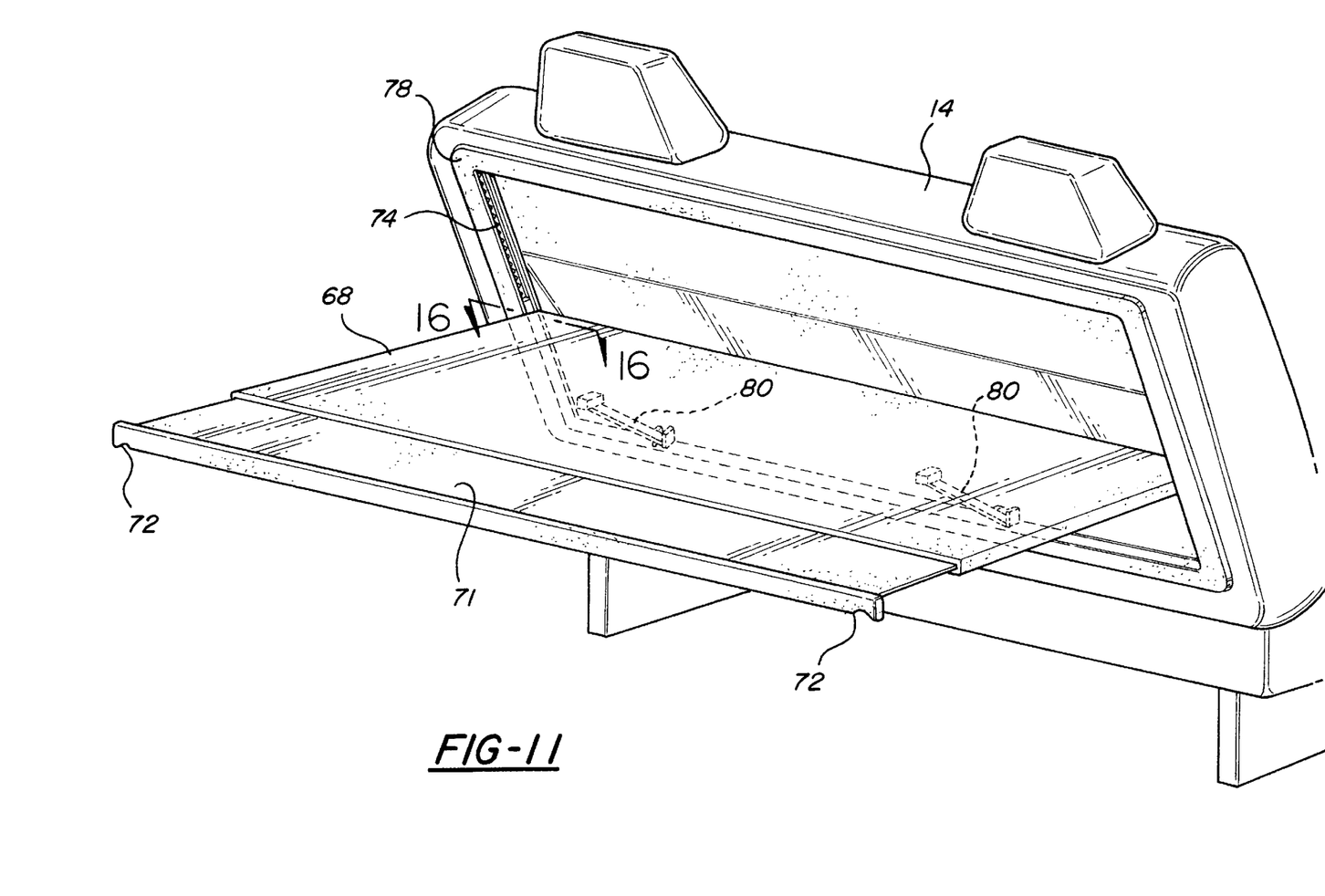
FIG. 11 is a perspective view of the rear seat of a minivan having another embodiment of the cargo storage unit of the present invention associated therewith.

Still other embodiments of the present invention may be implemented. For example, FIG. 11 shows a vehicular seat 14 having another embodiment of the shelf assembly of the present invention associated therewith. The FIG. 11 embodiment includes a shelf 68 which may be positionably adjusted on the back of the seat 14, as in the previous embodiment. The shelf 68 of the FIG. 11 embodiment further includes a telescopically projecting extension portion 71 which may be withdrawn therefrom to further increase its active area. As in the previous embodiment, integral cargo net hooks 72 may be molded into the shelf. As will be described in greater detail with regard to this embodiment, the shelf 68 is pivotably attached to the guide track 74, which in turn is mounted onto a flange 78 configured to be attached to the seat 14. As shown in phantom outline, the assembly of FIG. 11 further includes support braces 80, which, as in the previous embodiment, pivotally support and stabilize the shelf 68.

Figure 12:
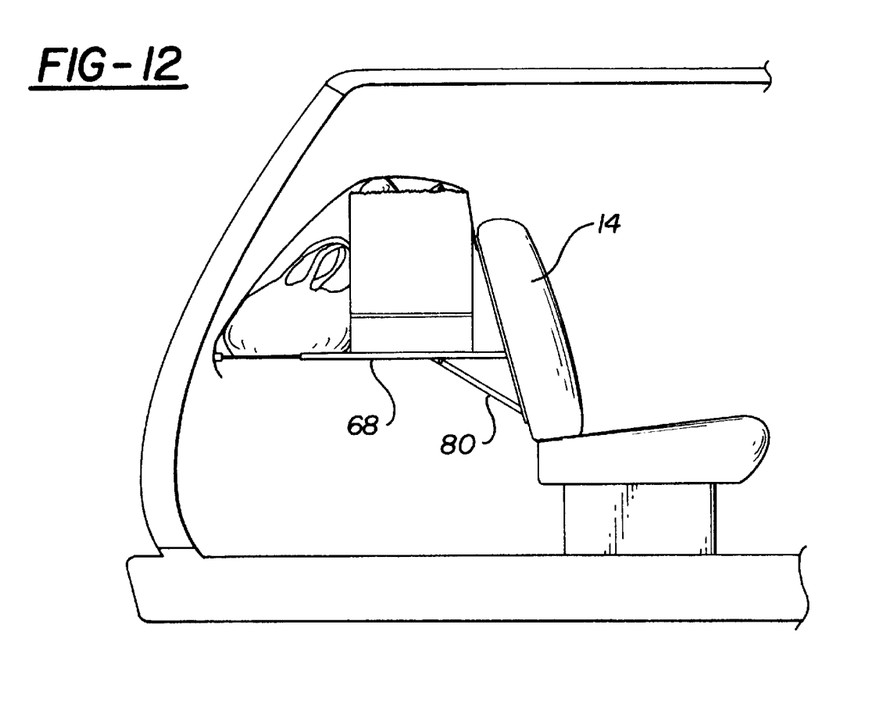
FIG. 12 is a side elevational view of the rear seat of a minivan showing the cargo storage unit of the FIG. 11 embodiment attached thereto, and in a use configuration.
Figure 13:
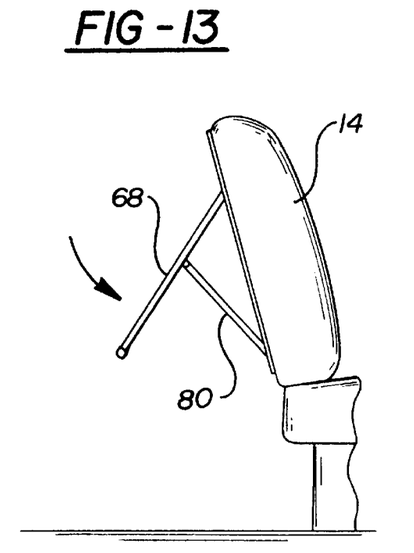
FIG. 13 is a side elevational view of a vehicular seat back showing the cargo storage unit of the FIG. 11 embodiment in a partially closed position.
Figure 14:
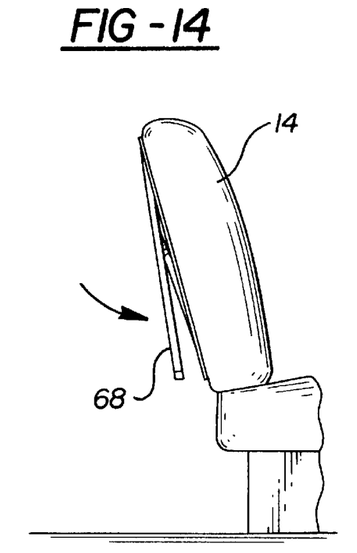
FIG. 14 is a side elevational view of the seat back of FIG. 11 showing the cargo storage unit of the present invention in an almost fully stowed position.

Referring now to FIGS. 12–14, there is shown the assembly of FIG. 11 as disposed in various orientations. FIG. 12 depicts the shelf assembly in one use configuration. It is to be noted that the FIG. 12 illustration is generally similar to that of FIG. 9, illustrating the previous embodiment. The FIG. 12 embodiment differs from that of FIG. 9 insofar as the shelf assembly thereof is fabricated in an inverted configuration relative to that of the previous embodiment. That is to say, the support brace 80 is disposed so as to contact the lower surface of the shelf 68. When the shelf of this embodiment is folded to a stowage position, it is folded downward, as shown in FIGS. 13 and 14. Folding involves the rear edge of the shelf 68 moving in an upward direction, and the front edge of the shelf moving in a downward direction. This inverted configuration minimizes access to the pinch points, further enhancing the safety of the shelf.

Figure 15:
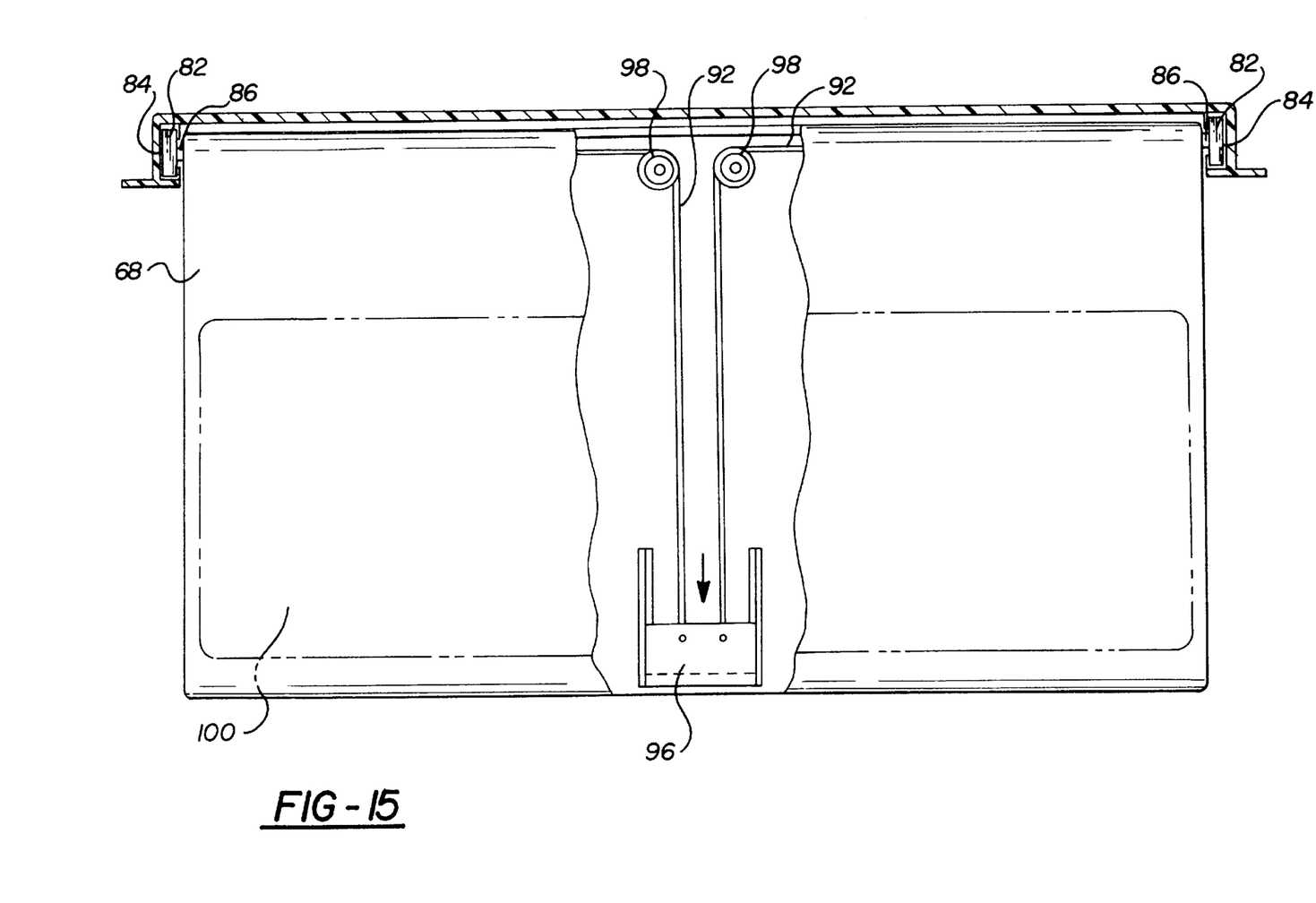
FIG. 15 is a top plan view, partially cut away, of the cargo storage unit of FIG. 11.
Figure 16:
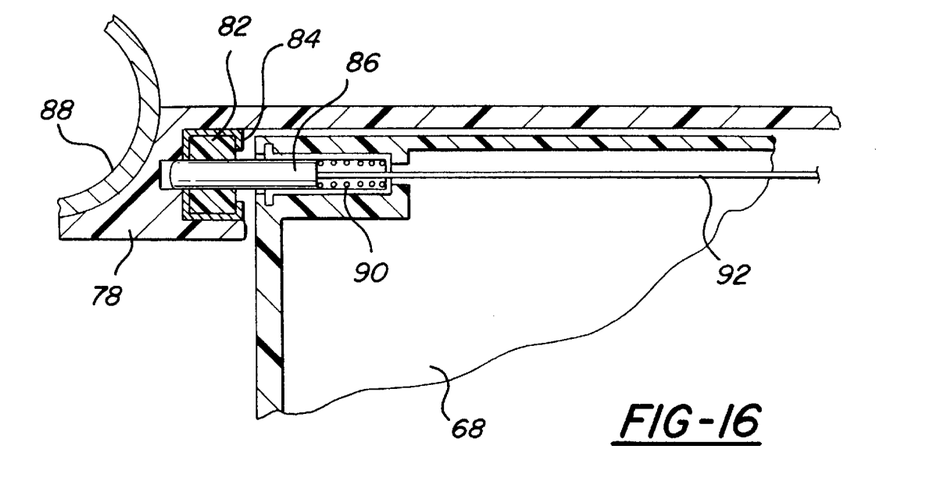
FIG. 16 is a cross-sectional view of a portion of the cargo storage unit of FIG. 15 better illustrating the manner in which the pivot block is locked to a guide track.

Referring now to FIG. 15, there is shown a top plan view of the FIG. 11 embodiment. As can be seen therein, the shelf 68 is pivotably supported in a pair of pivot blocks 82, which in turn slide in a support track 84. As will better be seen in FIG. 16, which is a partial, cut away view of the left hand portion of the FIG. 15 illustration, the shelf 68 is pivotably supported in the blocks 82 by means of a locking pin 86. The block 82 in turn travels in a track 84 which in turn is supported by a flange 78 which is configured to be attached to the frame 88 of a seat. As shown in FIG. 16, the pin 86 is biased by a spring 90, which causes it to project into the track 84 so as to lock the block 82 in a fixed position relative thereto. The pin 86 may be withdrawn by means of a cable 92, so as to free the block 82 to travel within the track 84, thereby permitting adjustment of the position of the shelf 68.

Figure 17:
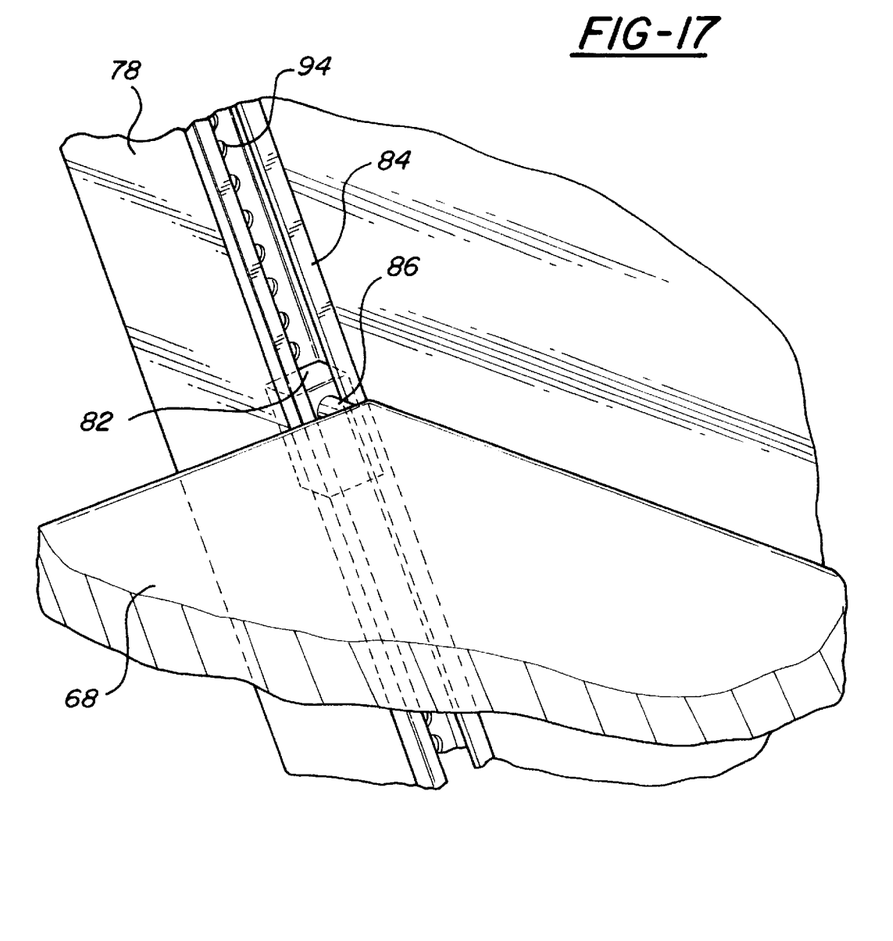
FIG. 17 is a perspective view of the portion of the cargo storage unit shown in FIG. 16.

Referring now to FIG. 17, there is shown the assemblage of parts depicted in FIG. 16, but in a perspective view. As shown in FIG. 17, the shelf 68 is pivotably supported in the block 82 by means of the pin 86. This pin 86 also engages one of a series of holes 94 defined in the track 84, so as to immobilize the block 82 in the track 84. In this manner, the shelf 68 is vertically retained in the track, but is free to pivot about the pin 86. As noted above, with regard to the other figures, the support braces stabilize the shelf 68. It will thus be appreciated that by positionally adjusting the block 84, the relative angular relationship between the shelf 68 and the seat back may be adjusted.

Referring back to FIG. 15, there is further shown a mechanism by which the cable 92 is positioned so as to control the pin 86. As depicted, the cable 92 runs through the interior of the shelf 68, around a pair of pulleys 98, to a handle 96, which is preferably disposed on the lower surface of the shelf 68. Activation of the handle 96 withdraws the pins 86 permitting the blocks 82 to slide in the tracks 84. As further noted with regard to FIG. 15, a thin body of non-slip material 100 may be affixed to an upper surface of the shelf 68. This material may be a rubber coating, or it may comprise a textured, granular coating such as the non-skid material employed on stairways and the like, and it facilitates retention of items on the shelf 68.

Figure 18:
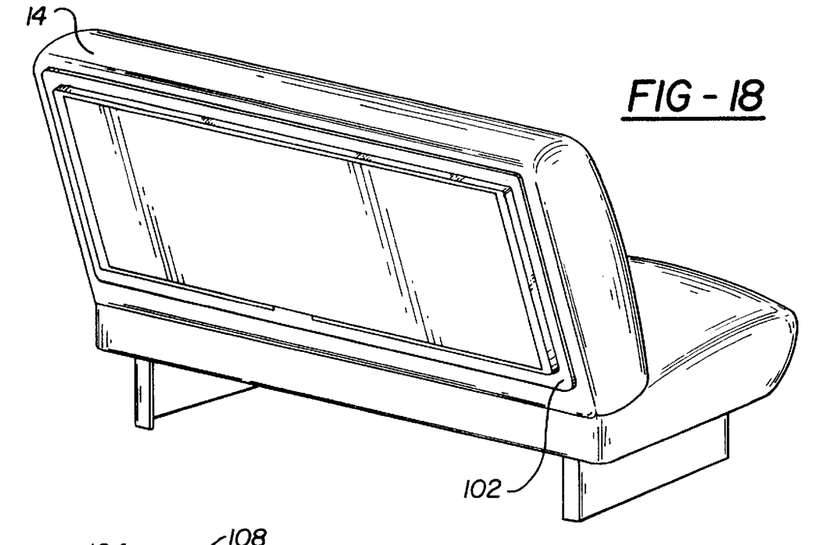
FIG. 18 is a perspective view of another embodiment of the cargo storage unit of the present invention, as shown in a fully stowed position.
Figures 19, 20:
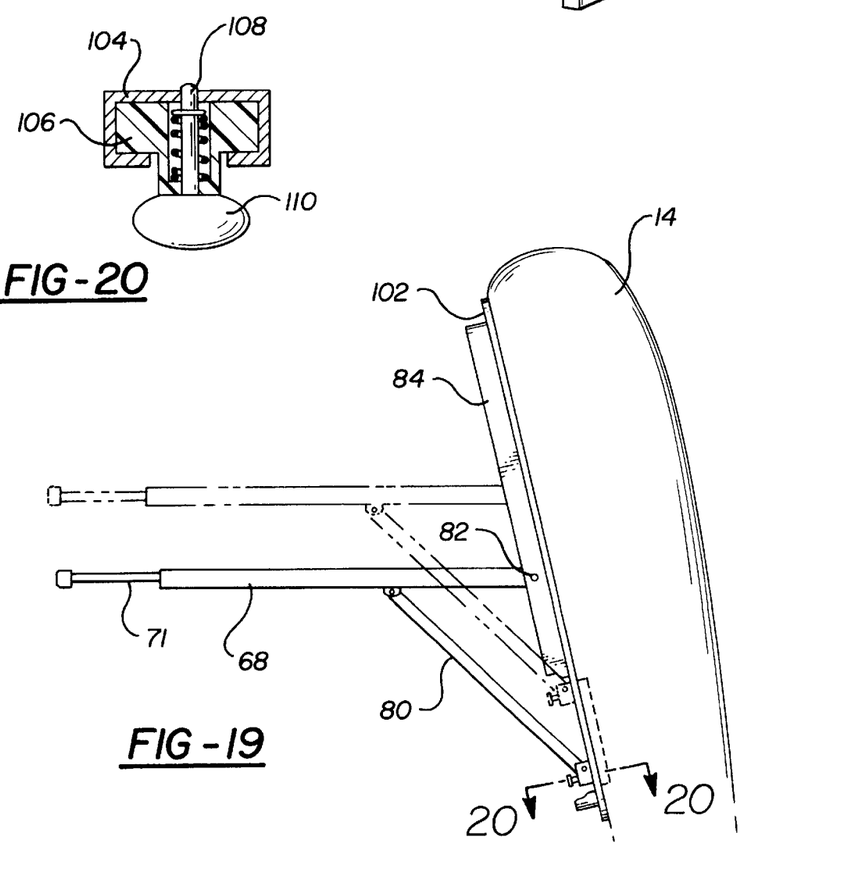
FIG. 19 is a side elevational view of the cargo storage unit of FIG. 18 as shown in two alternative use positions.
FIG. 20 is a cross-sectional view of the unit of FIG. 19 taken along lines 20—20.

Other configurations of the present invention may be implemented, and FIGS. 18–20 illustrate yet other embodiments of the invention. FIG. 18 depicts a shelf assembly, which is generally similar to those previously described, except that the assembly includes an external mounting flange 102 which is located so as to project from the rear of the shelf assembly. This external flange 102 provides a mounting surface which may be employed to affix the shelf unit to the exterior of a seat 14. The remainder of the unit may be configured as previously described, and may include any of the various features illustrated therein. An external flange is particularly advantageous when the shelf unit is being sold as an aftermarket item, since it permits ready affixation of the vehicular storage system to a pre-existing seat without requiring any modification thereto. This particular embodiment may also be employed as a factory installed option for the same reasons.

Referring now to FIG. 19, there is shown a shelf assembly of the present invention including an external flange 102, as attached to a seat. As will be noted, the shelf assembly of FIG. 19 includes a shelf 68, having an extension portion 71. The shelf 68 is pivotably attached to a support track 84 by a hinged pin 82 cooperating in conjunction with a block (not shown).

The assembly of FIG. 19 includes a support brace 80 having a first end pivotably affixed to the tray 68 at a first location, and a second end pivotably affixed to the flange 102. While in previous embodiments the support brace was fixedly attached to both the flange and tray, in the FIG. 19 embodiment the brace 80 is positionable with regard to its affixation point on the flange 102. Such positionable adjustment allows the entire assembly to be raised or lowered, without changing the angular relationship between the shelf 68 and seat back. Such repositioning is indicated in phantom outline.

Referring now to FIG. 20, there is shown a cross-sectional view of the mechanism for affixing the support brace 80 to the flange. This mechanism includes a track 104, supported by the flange, and including a block 106 configured to slide therein. Pin 108 locks the block 106 in the track; and when the brace 80 is to be repositioned, the pin 108 may be withdrawn by means of a knob 110.

In accord with the present invention, the various features illustrated hereinabove may be utilized in different combinations. For example, the positionable support brace may be employed with either an interior or exteriorly flanged embodiment, as well as with a top or bottom pivot shelf. The cargo net feature and shelf extensions, as well as the flip-up lip, may all be employed, optionally, with the various embodiments shown herein.

In view of the foregoing, it will be understood that the present invention provides a vehicular storage system which may be mounted within the back of a conventional seat. The system provides a stable, sturdy support surface which may be positionally adjusted relative to the seat back so as to retain articles in a number of different positional arrangements thereupon or thereunder. The system includes a quick release locking mechanism for positional adjustment, which in one embodiment is based upon depend biased locking gears. The system may include a deployable cargo net for retaining loose items, and may further include one or more pop-up lips formed on the shelf for further retaining items. The system is preferably fabricated from engineering thermoplastics and metals and is lightweight and high in strength. These and other advantages of the invention will be readily apparent to one of skill in the art from the foregoing drawings, discussion and description, it being understood that said illustrations represent particular embodiments of the invention but are not limitations upon the practice thereof, since numerous modifications and variations will be readily apparent to one of skill in the art in view of the teaching presented herein. It is the following claims, including all equivalents, which define the scope of the invention.

We claim:

1. A shelf assembly which is supported on a vehicular seat back, said assembly comprising:
   a guide member which is fixedly supported upon said seat back;
   a pivot member which is movably supported by the guide member;
   a shelf which is pivotably supported at a first edge by said pivot member;
   a support brace having a first end pivotably attached to said shelf and a second end which is pivotably supported by said seat back;
   positioning means for selectably immobilizing said pivot member relative to said guide member; whereby an angular relationship between said shelf and said guide member may be selectably defined by selectably immobilizing said pivot member; and
   a cargo net having a first end which is affixed to said shelf assembly, and a second end which includes means for selectably attaching said second end to, and releasably detaching said second end from, said shelf.

2. A shelf assembly as in claim 1, wherein said guide member is a track, and said pivot member is a pivot block which is configured to slide in said track.

3. A shelf assembly as in claim 2, wherein said positioning means includes a pin which operates to lock said pivot block in said track.

4. A shelf assembly as in claim 3, further including a handle disposed upon said shelf, said handle being in mechanical communication with said pin by means of a cable.

5. A shelf assembly as in claim 1, wherein a guide member is affixed to a flange which is configured to be attached to the frame of a vehicular seat.

6. A shelf assembly as in claim 5, wherein the second end of said support brace is affixed to said flange.

7. A shelf assembly as in claim 6, wherein the second end of said brace is affixed to said flange so as to be repositionable thereupon.

8. A shelf assembly as in claim 1, wherein said guide member comprises a toothed rack, and said pivot member comprises a gear which is engageable with said rack.

9. A shelf assembly as in claim 8, wherein said positioning means is operative to immobilize said gear.

10. A shelf assembly as in claim 1, wherein said shelf includes a lip portion which is biasable from a first position in which it is substantially planar to a top surface of said shelf, to a second position in which it is substantially perpendicular to said top surface.

11. A shelf assembly as in claim 1, wherein said shelf includes an extension shelf portion which is configured to telescopically extend therefrom.

12. A shelf assembly as in claim 1, wherein at least a portion of a surface of said shelf tray has a high friction coating thereupon.

13. A shelf assembly which is supported on a vehicular seat back, said assembly including:
   a guide member which is fixedly supported upon said seat back;
   pivot means which is movably supported upon said guide member;
   a shelf pivotably supported at a first edge by said pivot means and supported upon said guide member thereby, so that an angle defined between said shelf and said guide member may be varied;
   positioning means for selectably immobilizing said shelf in said pivot means; whereby the angular relationship of said shelf tray to said guide member may be selectably adjusted; and
   a cargo net having a first end which is affixed to said shelf assembly, and a second end which is selectably engagable with, and releasable from, said shelf.

* * * * *